US005542550A

United States Patent [19]
Kakakvoulis-Perera et al.

[11] Patent Number: 5,542,550
[45] Date of Patent: Aug. 6, 1996

[54] STORAGE RACK FOR HOLDING ARTICLES IN A CANTILEVER FASHION

[75] Inventors: Dionisis Kakakvoulis-Perera, 2018 Senate St., St. Louis, Mo. 63118; Chris Minichiello, St. Louis, Mo.

[73] Assignee: Dionisis Kakakvoulis-Perera, St. Louis, Mo.

[21] Appl. No.: 278,188

[22] Filed: Jul. 20, 1994

[51] Int. Cl.⁶ .................................................. A47G 29/00
[52] U.S. Cl. .............................. 211/40; 211/41; 211/163; 206/307.1
[58] Field of Search ........................ 211/40, 163, 41, 211/55; D6/407, 629–35; 312/249.4, 9.48; 206/308.1, 308.3, 307.1

[56] References Cited

U.S. PATENT DOCUMENTS

| D. 156,256 | 11/1949 | Kivett | D6/407 |
|---|---|---|---|
| D. 319,741 | 9/1991 | Sylvester | D6/407 |
| D. 321,291 | 11/1991 | Shoemaker et al. | D6/407 |
| D. 321,607 | 11/1991 | Sheung | D6/407 |
| D. 328,674 | 8/1992 | Dokoupil et al. | D6/407 |
| D. 329,548 | 9/1992 | Wells et al. | D6/407 |
| D. 331,166 | 11/1992 | Ohadi | D6/570 |
| D. 333,225 | 2/1993 | Robinson | D6/407 |
| D. 342,395 | 12/1993 | Huang | D6/407 |
| D. 351,513 | 10/1994 | Kreppein | D6/407 |
| D. 356,700 | 3/1995 | Lee | D6/407 |
| D. 357,331 | 4/1995 | Yeh | D6/407 |
| 1,900,053 | 3/1933 | Glidden | 211/41 |
| 2,852,030 | 9/1958 | Nord | 211/41 |
| 3,461,842 | 8/1969 | Conrad et al. | 211/41 |
| 4,597,614 | 7/1986 | Alexander | 312/42 |
| 4,669,612 | 6/1987 | Mortensen | 211/41 |
| 4,709,815 | 12/1987 | Price et al. | 206/387 |
| 5,176,264 | 1/1993 | De Palma | 211/40 |
| 5,188,240 | 2/1993 | Marino et al. | 211/41 |
| 5,195,642 | 3/1993 | Dardashti | 211/40 |
| 5,350,069 | 9/1994 | Agwu | 211/41 |
| 5,370,242 | 12/1994 | Huang | 211/40 |
| 5,411,144 | 5/1995 | Deupree | 211/32 |

FOREIGN PATENT DOCUMENTS 1216157  4/1960  France .................................. 211/40

*Primary Examiner*—Leslie A. Braun
*Assistant Examiner*—Brian J. Hamilla
*Attorney, Agent, or Firm*—Senniger, Powers, Leavitt & Roedel

[57] ABSTRACT

A storage rack for articles having predetermined, substantially identical thicknesses comprises a body having opposite ends and at least one generally horizontal slot formed in the enclosure for receiving at least one edge of one of the articles to releasably hold the article generally horizontally. The slot having opposing first and second edges, portions of which lie in first and second boundary planes to releasably hold the article. The remainder portions of the first and second edges lie outside the first and second boundary planes and provide for easy initial insertion of the edge of the article in the slot. The body is adapted to stand erect on one of its ends.

13 Claims, 3 Drawing Sheets

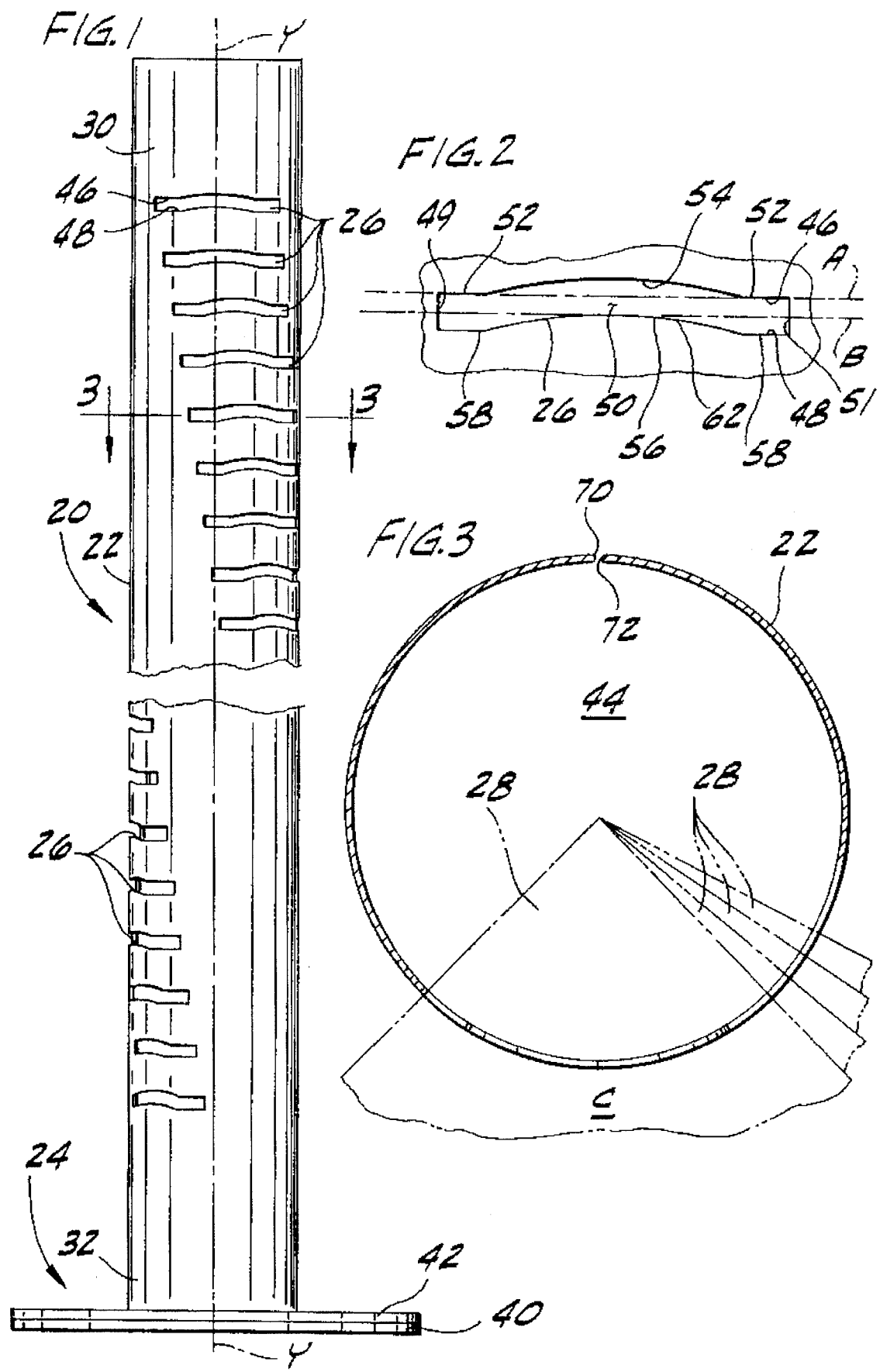

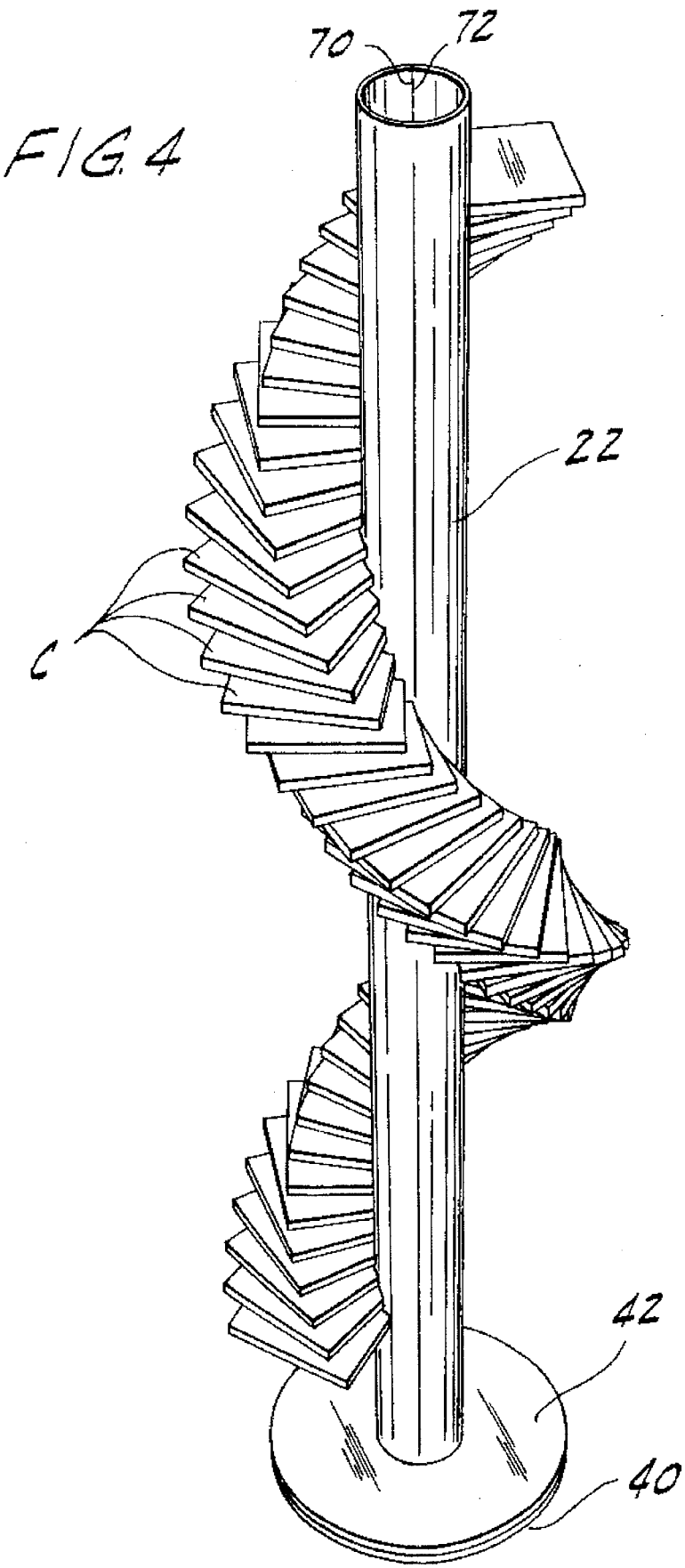

5,542,550

STORAGE RACK FOR HOLDING ARTICLES IN A CANTILEVER FASHION

BACKGROUND OF THE INVENTION

This invention relates generally to storage racks and more particularly to a storage rack which holds articles in cantilever fashion and a method for manufacturing such racks.

The development of various types of recording media (e.g., compact disks ("CDs"), video cassettes, etc.) and containers therefor (e.g., U.S. Pat. No. 3,069,213) has resulted in the creation of specially designed storage racks for orderly storage of the recording media and containers. For instance, U.S. Pat. Nos. 4,709,815, 5,176,264, 5,188, 240, D321,607, D328,674, and D342,495 disclose storage racks for holding recording media and containers therefor.

While these racks serve their intended purpose, some are complex to manufacture and/or are not aesthetically pleasing. Many presently existing racks of the type which hold the container on the rack by gripping only a portion of the container permit the containers to tilt relative to horizontal which takes away from the aesthetics of the loaded rack. Racks which overcome this tilting problem by tightly gripping the containers are often inconvenient to use since the containers are difficult to insert into their respective holding device. Further, precise tolerances are required for the manufacture of these racks to obtain the tight grip on the containers while allowing sufficient space for the insertion of the container.

SUMMARY OF THE INVENTION

Among the several objects and features of the present invention may be noted the provision of a storage rack which releasably holds articles generally horizontally; the provision of such a rack which holds said articles in cantilever fashion; the provision of such a rack which is configured to be aesthetically pleasing when holding the articles; the provision of such rack which is rotatable about its longitudinal axis; and the provision of such a rack which permits easy loading of the articles.

Also among the several objects and features of the present invention may be noted the provision of a method of manufacturing storage racks which is relatively simple to carry out; and the provision of such a method which produces inexpensive storage racks.

Generally, a storage rack of the present invention for articles having predetermined, substantially identical thicknesses comprises a hollow body having opposite open ends and at least one generally horizontal slot formed in the hollow body for receiving at least one edge of one of the articles to releasably hold the article generally horizontally. The hollow body is adapted to stand erect on one of its ends.

A second aspect of the present invention involves a method of making a storage rack for holding articles having predetermined, substantially identical thickness dimensions. The method comprises the steps of providing a rectangular, flat sheet of substantially rigid material having two opposing longitudinal edges, stamping at least one slot in the flat sheet of material, and rolling the material so that the longitudinal edges of the material abut along substantially the entire length of the edges. The slot stamped in the sheet of material is formed so that it has opposing first and second edges and an article receiving space defined by spaced, parallel first and second boundary planes. The article receiving space has a height substantially the same as the thickness of one of the articles. The first edge of the slot has a portion lying in the first boundary plane and a remainder spaced away from the article receiving space. The second edge of the slot has a portion lying in the second boundary plane and a remainder spaced away from the article receiving space.

Other objects and features will be in part apparent and in part pointed out hereinafter.

BRIEF DESCRIPTION OF THE DRAWINGS

FIG. 1 is a side elevational view of the storage rack of the present invention;

FIG. 2 an enlarged fragmentary view of the rack showing a slot formed therein;

FIG. 3 a horizontal section taken along line 3—3 of FIG. 1;

FIG. 4 is a perspective of the storage rack and CD containers held thereon; and

Corresponding reference characters indicate corresponding parts throughout the several views of the drawings.

DETAILED DESCRIPTION OF THE PREFERRED EMBODIMENT

Figure 5:
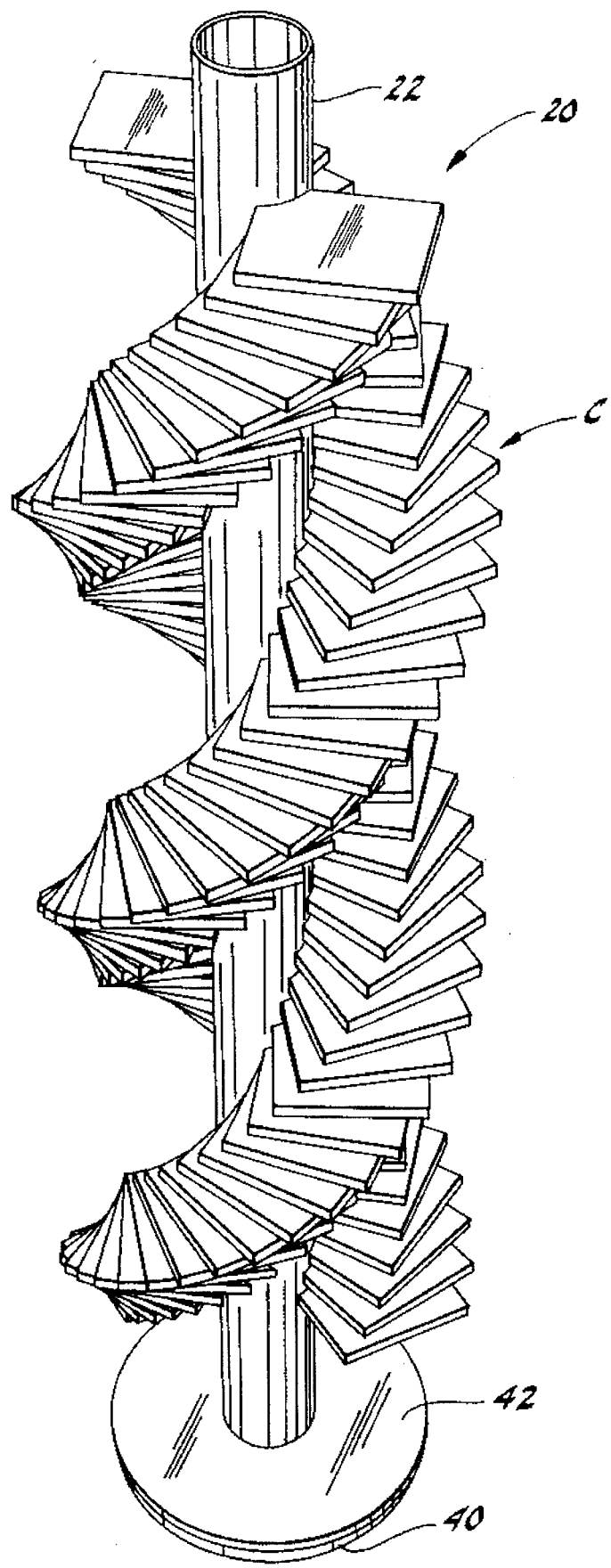
FIG. 5 is a perspective of a second embodiment of the storage rack holding CD containers thereon.

Referring now to the drawings, a storage rack for articles having predetermined, substantially identical thicknesses, such as CD containers (each indicated at C), is indicated generally at 20. As shown in FIG. 1, the rack 20 comprises a body 22, a base for maintaining the body in an upright position, generally indicated at 24, and a series of substantially horizontal slots 26 formed in the body. As shown in FIG. 3, each slot 26 receives a corner 28 of one of the CD containers C so that the rack releasably holds this container in cantilever fashion.

As illustrated in FIG. 1, the body 22 has a thin wall 29 formed in the shape of a tube, and opposite ends 30, 32. In a preferred embodiment, the hollow body 22 is made of a glossy metal and is approximately 4 feet in length and 5 inches in diameter to give a sleek, elongate appearance. Further, the thickness of the wall 29 of the cylindrical body 22 is approximately one-eighth inch. It will be understood that the body 22 of the rack 20 can be non-circular in cross-section and have different dimensions without departing from the scope of the present invention. It will be further understood that the body 22 can be solid (e.g., cylindrically shaped) or made of other material, such as plastic, without departing from the scope of the present invention.

The body 22 is supported in an upright position by a base 24 mounted on the end 32 of the body 22. The base 24 is sized such that it stabilizes the elongate body 22 as loaded with CD containers C or the like. In the preferred embodiment, the base 24 is circular and approximately one foot in diameter. It will be understood that base 24 can be of many different configurations and dimensions without departing from the scope of the present invention.

Preferably, the body 22 of the storage rack 20 is rotatable about a longitudinal axis Y of the body 22. For that purpose, base 24 comprises a support member 40 sized to support the elongate body in a stable, upright position and a turntable 42 mounted on the support member 40 for rotation about the axis Y. The support member 40 includes a race (not shown) encircling the axis Y extending from the center point of the support member and ball bearings (not shown) positioned therein. The turntable 42 is rotatably supported by the ball bearings of the support member 40. The body 22 is securely mounted on the turntable 42 to enable the rotation of the body about the axis Y.

In the preferred embodiment, the body 22 has a series of generally horizontal slots 26 formed therein (FIG. 1). It will be understood that each slot 26 can be significantly canted with respect to horizontal and still be considered generally horizontal for the purpose of the present invention. The slot 26 is generally horizontal when the deviation from horizontal is less than that which would cause the container C to fall out of a longitudinal end of the slot due to its own weight.

The rack 20 is constructed to hold the CD containers C in the slots 26 of its body 22 so that the containers extend outwardly from the body in cantilever fashion. The CD containers C are held firmly by the rack 20 in generally horizontal planes perpendicularly to the longitudinal axis Y of the body 22. Each slot is configured to receive a portion of the CD container with the container extending through the slot into an interior space 44 of the body 22. To hold the CD container C in a horizontal plane, each slot 26 is defined by opposing upper and lower ("first and second") longitudinal edges, designated 46, 48, respectively, and opposing transverse edges, designated 49, 51, respectively. An article receiving space 50 within the slot 26 is defined by spaced, parallel upper and lower ("first and second") boundary planes, indicated at A, B, respectively. The article receiving space 50 has a height substantially the same as the thickness of the CD container C and a length defined by the dimension parallel to the planes A, B of that portion of the container C lying in the slot (FIG. 3). Typically, the length of the article receiving space 50 is defined by the transverse edges 49, 51 of the slots. As shown in FIG. 2, the upper edge 46 of each slot 26 has portions 52 lying in the upper boundary plane A and a remainder portion 54 spaced away from the article receiving space 50. Similarly, the lower edge 48 of each slot 26 has portions 56 lying in the lower boundary plane B and a remainder portion 58 spaced away from the article receiving space 50. The shape of each slot 26 is such that the opposite longitudinal edges 46, 48 of the slot releasably hold the article C in the article receiving space 50 by gripping the article with the portions 52, 56 of the opposite edges lying in the boundary planes A, B.

As illustrated in FIG. 2, the portions 52 of the upper edge 46 are the portions of the upper edge lying in the upper boundary plane A. The portions 56 of the lower edge 48 lying in the lower boundary plane B is substantially a point on the lower edge which is tangent to the lower boundary plane B generally at the apex of an arcuate middle portion 62 of the lower edge. The remainder portion 54 of the upper edge 46 lies opposite the middle portion 62 of the lower edge 48 and arcs upwardly away from the upper boundary plane A along a path parallel to the middle portion of the lower edge. The remainder portion 54 of the upper edge 45 and the middle portion 62 of the lower edge 48 define between them an upwardly arcing middle portion of the slot 26. As may be seen in FIG. 2, the slot 26 has channel shaped ends on either side of the arcuate middle portion. A CD container C can be easily inserted into the slot 26 since the remainder portion 54 of the upper edge 46 is spaced away from the first boundary plane A. Thus, the distance between the middle portion 62 of the lower edge 48 and any point on the remainder portion 54 of the upper edge 46 is greater than the thickness of the CD container C. Therefore, the corner 28 of the CD container C can be inserted into the slot 26 between the remainder portion 54 of the upper edge 46 and the middle portion 62 of the lower edge 48. As the container C is inserted, the container engages and is gripped by the portions 52 of the upper edge 46 near the transverse edges 49, 51 of the slot and the portion 56 of the lower edge 48. The container C is thus securely held at corner 28 by slot 26 with the rest of the container extending horizontally away from the body 22 (FIG. 3). With this unique slot configuration, the container C is firmly gripped by the slot 26 at one of its corners 28 such that the container does not angle downwardly with respect to a horizontal plane perpendicular to the longitudinal axis Y of the body 22.

The series of slots 26 are formed in the body 22 to position each container C in parallel, spaced relation with respect to the remaining containers (FIG. 4). In the preferred embodiment, the slots 26 are vertically spaced approximately 1½ inches on center. Each slot 26 is further circumferentially offset from each adjacent slot, preferably approximately 5°, such that the slots form a helix around the body 22. As the storage rack 20 is loaded with CD containers C, the helical arrangement of the slots 26 results in the rack holding the CD containers in a spiralling manner around the body 22 (FIG. 4). The positioning of the slots 26 in such a manner gives the CD rack a striking appearance when fully loaded with containers C. In a second embodiment of the storage rack 20 designed to hold more containers (FIG. 5), the slots 26 formed in the body 22 are arranged along two helices. The CD containers C are thus held in two parallel rows of spirals extending around the enclosed body 22.

The method of making the above-described storage rack is simple, efficient and relatively inexpensive. The method includes providing a rectangular, flat sheet of material (preferably, steel) having two longitudinal edges 70, 72. A series of slots 26 are stamped in the flat sheet of material. Each slot 26 is formed to have the configuration described with respect to the storage rack.

The stamping of slots 26 in the material is started approximately 6 inches from an edge of the material which will become the upper end 30 of the tubular body. In the embodiment designed to hold CD containers, the slot 26 can be in the range of 2.5–4.0 inches in length (preferably approximately 3.5 in.) and have a height dimension in the range of 0.4–0.5 inches (preferably approximately 0.45 in.). The height dimension of the article receiving space 50 is approximately 0.375 inches. In the embodiment for CD containers, the next slot 26 in the series of slots is spaced toward an edge of the material which will become lower end 32 of the tubular body 22 away from the first slot approximately 1.5 inches on center and laterally offset approximately 0.25 inches. Each adjacent slot 26 is likewise spaced from the previous slot until the last slot is formed in the material approximately 4 in. from the lower end 32.

The stamped material is then rolled so that the longitudinal edges 70, 72 of the material abut along substantially the entire length of the edges. The edges are joined as by welding to form the tubular body 22 of the rack 20. This method of manufacturing the rack 20 is an efficient and economical method of producing racks for holding CD containers. In the preferred embodiment of the rack 20, the enclosed body 22 formed by this method is further placed on a base 24 to aid the body in standing erect on one of its ends 32.

It will be understood that a variety of different materials and body configurations may be used in a rack 20 of this invention depending on the quantity of CD containers to be held, the appearance of the container desired, and other parameters.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A storage rack for articles having substantially identical thicknesses, said rack comprising a body having opposite ends, the body being adapted to stand erect on one of said ends, at least one generally horizontal slot formed in the body for receiving at least one edge of one of said articles so that the rack releasably holds said article generally horizontally, said slot having opposing first and second edges, and an article receiving space defined by spaced, parallel first and second boundary planes, the first edge of the slot having a portion lying in said first boundary plane and a remainder spaced away from said article receiving space, the second edge of the slot having a portion lying in said second boundary plane and a remainder spaced away from said article receiving space, wherein the distance between opposing points of the first and second edges being everywhere greater than the distance of opposing points lying in respective boundary planes for easy initial insertion of the edge of said article in said slot, the arrangement being such that the opposing first and second edges of said slot releasably hold said article in said article receiving space by gripping said article with the portions of the opposing edges lying in said boundary planes.

2. A storage rack as set forth in claim 1 wherein the body is generally cylindrical.

3. A storage rack as set forth in claim 2 further including a base mounted on one of said of the body for maintaining the rack in upright position on one of said ends.

4. A storage rack as set forth in claim 3 wherein the body is rotatable about a longitudinal centerline of the body.

5. A storage rack as set forth in claim 1 wherein said rack has more than one generally horizontal slot formed therein and wherein the rack holds said articles in the slots in spaced, parallel relation.

6. A storage rack as set forth in claim 5 wherein the slots are further formed in the rack in a helical pattern so that the rack holds said articles in the slots in a spiralling manner around said body.

7. A storage rack as set forth in claim 5 wherein the slots are further formed in the rack along two parallel, diametrically opposed helices to enable the rack to hold said articles in the slots in two rows of spirals around said body.

8. A storage rack as set forth in claim 1 wherein the slot has two generally horizontal, channel-shaped ends and an arcuate middle portion.

9. A storage rack as set forth in claim 8 wherein the arcuate middle portion is arcing upwardly and wherein said first edge is the upper edge of the slot and said second edge is the lower edge of the slot, the upper edge of said channel shaped ends of the slot being the portion of said first edge lying in said first boundary plane, the portion of the lower edge at the apex of said arcuate middle portion being the portion of said lower edge lying in said second boundary plane, said second boundary plane being in spaced, parallel relation to said first boundary plane.

10. A storage rack as set forth in claim 1 wherein the body is hollow.

11. A storage rack as set forth in claim 1 wherein the distance between opposing points on the first and second edges remains substantially constant along the length of the slot.

12. A storage rack as set forth in claim 1 wherein the first edge portion lying in the first boundary plane is opposite the second edge remainder spaced away from the article receiving space, and the second edge portion lying in the second boundary plane is opposite the first edge remainder spaced away from the article receiving space.

13. A storage rack for articles having substantially identical thicknesses, said rack comprising:

a hollow body having opposite open ends, the hollow body being adapted to stand erect on one of said ends, at least generally horizontal one slot formed in the hollow body for receiving at least one edge of one of said articles so that the rack releasably holds said article generally horizontally, the slot having opposing upper and lower edges, two generally horizontal, channel-shaped ends and an upwardly arcing arcuate middle portion, and an article receiving space defined by spaced, parallel first and second boundary planes, the upper edge of the slot having a portion lying in said first boundary plane and a remainder spaced away from said article receiving space, the lower edge of the slot having a portion lying in said second boundary plane and a remainder spaced away from said article receiving space, the upper edge of said channel shaped ends of the slot being the portion of the upper edge lying in said first boundary plane, the portion of the bottom edge at the apex of said arcuate middle portion being the portion of the lower edge lying in said second boundary plane, said second boundary plane being in spaced, parallel relation to said first boundary plane, the arrangement being such that the opposing upper and lower edges of the slot releasably hold said article in said article receiving space by gripping said article with the portions of the opposing upper and lower edges lying in said boundary planes.

* * * * *